US009313233B2

(12) United States Patent
Sprague et al.

(10) Patent No.: US 9,313,233 B2
(45) Date of Patent: Apr. 12, 2016

(54) SYSTEMS AND METHODS FOR DETECTING ASSOCIATED DEVICES

(71) Applicant: PALANTIR TECHNOLOGIES, INC., Palo Alto, CA (US)

(72) Inventors: Matthew Sprague, Santa Monica, CA (US); Andy Isaacson, Palo Alto, CA (US)

(73) Assignee: Plantir Technologies Inc., Palo Alto, CA (US)

( * ) Notice: Subject to any disclaimer, the term of this patent is extended or adjusted under 35 U.S.C. 154(b) by 171 days.

(21) Appl. No.: 14/027,118

(22) Filed: Sep. 13, 2013

(65) Prior Publication Data

US 2015/0080012 A1 Mar. 19, 2015

(51) Int. Cl.
*H04W 24/00* (2009.01)
*H04L 29/06* (2006.01)
*H04W 64/00* (2009.01)

(52) U.S. Cl.
CPC ............. *H04L 63/302* (2013.01); *H04W 64/00* (2013.01)

(58) Field of Classification Search
CPC ........... H04W 4/04; H04W 8/02; H04W 8/08; H04W 8/16; H04W 60/04; H04W 64/00; H04L 63/302
USPC ........................................... 455/456.1, 414.1
See application file for complete search history.

(56) References Cited

U.S. PATENT DOCUMENTS

| 5,021,792 | A | 6/1991 | Hwang |
| 5,555,503 | A | 9/1996 | Kyrtsos et al. |
| 5,670,987 | A | 9/1997 | Doi et al. |
| 6,141,659 | A | 10/2000 | Barker et al. |
| 6,189,003 | B1 | 2/2001 | Leal |
| 6,272,489 | B1 | 8/2001 | Rauch et al. |
| 6,642,945 | B1 | 11/2003 | Sharpe |
| 7,188,100 | B2 | 3/2007 | De Bellis et al. |
| 7,383,053 | B2 | 6/2008 | Kent et al. |

(Continued)

FOREIGN PATENT DOCUMENTS

| EP | 2400448 | 12/2011 |
| EP | 2816513 | 12/2014 |

(Continued)

OTHER PUBLICATIONS

Official Communication for U.S. Appl. No. 13/181,392 dated Aug. 28, 2014.

(Continued)

*Primary Examiner* — Amancio Gonzalez
(74) *Attorney, Agent, or Firm* — Finnegan, Henderson, Farabow, Garrett & Dunner, LLP

(57) ABSTRACT

Systems and methods are disclosed for detecting associated devices. In accordance with one implementation, a method is provided for detecting associated devices. The method includes obtaining information about a target device and determining, based on the information about the target device, one or more target observations that include a target time and a target location. The method also includes identifying one or more second observations of one or more candidate devices, wherein the candidate observations include a second time and a second location that correspond with the target time and the target location. In addition, the method includes determining, from the one or more candidate devices, any associated devices that may correspond with the target device.

20 Claims, 7 Drawing Sheets

(56) References Cited

U.S. PATENT DOCUMENTS

| | | | |
|---|---|---|---|
| 7,523,100 B1 | 4/2009 | Bionda et al. | |
| 7,529,734 B2 | 5/2009 | Dirisala | |
| 7,652,622 B2 | 1/2010 | Hansen et al. | |
| 7,706,817 B2 | 4/2010 | Bamrah et al. | |
| 7,725,547 B2 | 5/2010 | Albertson et al. | |
| 7,747,648 B1 | 6/2010 | Kraft et al. | |
| 7,945,470 B1 | 5/2011 | Cohen et al. | |
| 8,028,894 B2 | 10/2011 | Lapstun et al. | |
| 8,402,047 B1 | 3/2013 | Mangini et al. | |
| 8,521,135 B2* | 8/2013 | Cryderman | 455/412.1 |
| 8,739,059 B2 | 5/2014 | Rabenold et al. | |
| 8,762,870 B2 | 6/2014 | Robotham et al. | |
| 8,849,254 B2* | 9/2014 | Bolon | H04W 24/08 455/414.1 |
| 9,037,407 B2 | 5/2015 | Thompson | |
| 9,123,086 B1 | 9/2015 | Freeland et al. | |
| 2003/0152277 A1 | 8/2003 | Hall et al. | |
| 2003/0227746 A1 | 12/2003 | Sato | |
| 2004/0203380 A1 | 10/2004 | Hamdi et al. | |
| 2005/0210409 A1 | 9/2005 | Jou | |
| 2006/0116991 A1 | 6/2006 | Calderwood | |
| 2006/0206235 A1 | 9/2006 | Shakes et al. | |
| 2006/0250764 A1 | 11/2006 | Howarth et al. | |
| 2007/0043744 A1 | 2/2007 | Carro | |
| 2007/0130541 A1 | 6/2007 | Louch et al. | |
| 2007/0198571 A1 | 8/2007 | Ferguson et al. | |
| 2007/0250491 A1 | 10/2007 | Olszak et al. | |
| 2008/0007618 A1 | 1/2008 | Yuasa | |
| 2009/0005070 A1 | 1/2009 | Forstall et al. | |
| 2009/0138790 A1 | 5/2009 | Larcheveque et al. | |
| 2009/0143052 A1 | 6/2009 | Bates et al. | |
| 2009/0156231 A1 | 6/2009 | Versteeg et al. | |
| 2009/0265105 A1 | 10/2009 | Davis et al. | |
| 2009/0315679 A1 | 12/2009 | Bauchot et al. | |
| 2010/0073315 A1 | 3/2010 | Lee et al. | |
| 2010/0082842 A1 | 4/2010 | Lavrov et al. | |
| 2010/0185984 A1 | 7/2010 | Wright et al. | |
| 2010/0214117 A1 | 8/2010 | Hazzani | |
| 2010/0223543 A1 | 9/2010 | Marston | |
| 2010/0306713 A1 | 12/2010 | Geisner et al. | |
| 2011/0022312 A1 | 1/2011 | McDonough et al. | |
| 2011/0158469 A1 | 6/2011 | Mastykarz | |
| 2011/0202557 A1 | 8/2011 | Atsmon et al. | |
| 2011/0310005 A1 | 12/2011 | Chen et al. | |
| 2012/0010812 A1 | 1/2012 | Thompson | |
| 2012/0032975 A1 | 2/2012 | Koch | |
| 2012/0036434 A1 | 2/2012 | Oberstein | |
| 2012/0150578 A1 | 6/2012 | Mangat et al. | |
| 2012/0166929 A1 | 6/2012 | Henderson et al. | |
| 2012/0216106 A1 | 8/2012 | Casey | |
| 2012/0268269 A1 | 10/2012 | Doyle | |
| 2013/0013642 A1 | 1/2013 | Klein et al. | |
| 2013/0196614 A1 | 8/2013 | Pahlevani | |
| 2013/0235749 A1 | 9/2013 | Cho et al. | |
| 2013/0262171 A1 | 10/2013 | Solodko et al. | |
| 2013/0262497 A1 | 10/2013 | Case et al. | |
| 2014/0258827 A1 | 9/2014 | Gormish et al. | |
| 2014/0302783 A1* | 10/2014 | Aiuto et al. | 455/41.2 |
| 2014/0357299 A1 | 12/2014 | Xu et al. | |
| 2015/0080012 A1 | 3/2015 | Sprague et al. | |

FOREIGN PATENT DOCUMENTS

| | | |
|---|---|---|
| EP | 2916276 | 9/2015 |
| WO | WO 2004/038548 | 5/2004 |

OTHER PUBLICATIONS

Official Communication for New Zealand Patent Application No. 622501 dated Apr. 1, 2014.

Official Communication for New Zealand Patent Application No. 622501 dated Jun. 5, 2014.

Official Communication for European Patent Application No. 14159447.3 dated Nov. 26, 2014.

Official Communication for European Patent Application No. 14159447.3 dated Jan. 8, 2015.

Notice of Allowance for U.S. Appl. No. 13/181,392 dated Jan. 22, 2015.

Notice of Allowance for U.S. Appl. No. 13/838,815 dated Jan. 29, 2015.

Notice of Allowance for U.S. Appl. No. 13/838,815 dated Jun. 19, 2015.

Official Communication for U.S. Appl. No. 14/088,251 dated Feb. 12, 2015.

Official Communication for U.S. Appl. No. 14/487,342 dated Apr. 23, 2015.

Official Communication for U.S. Appl. No. 14/196,814 dated May 5, 2015.

Official Communication for U.S. Appl. No. 14/088,251 dated May 20, 2015.

Official Communication for U.S. Appl. No. 13/831,199 dated Jun. 3, 2015.

Official Communication for U.S. Appl. No. 14/088,251 dated Jun. 30, 2015.

Official Communication for U.S. Appl. No. 14/334,232 dated Jul. 10, 2015.

Restriction Requirement for U.S. Appl. No. 13/839,026 dated Apr. 2, 2015.

IBM, "Determining Business Object Structure," IBM, 2004, 9 pages.

Notice of Allowance for U.S. Appl. No. 14/487,342 dated Sep. 23, 2015.

Notice of Allowance for U.S. Appl. No. 14/334,232 dated Nov. 10, 2015.

Notice of Allowance for U.S. Appl. No. 14/690,905 dated Nov. 23, 2015.

Official Communication for U.S. Appl. No. 13/839,026 dated Aug. 4, 2015.

Official Communication for U.S. Appl. No. 14/088,251 dated Aug. 26, 2015.

Official Communication for U.S. Appl. No. 13/831,199 dated Oct. 6, 2015.

Official Communication for U.S. Appl. No. 14/690,905 dated Oct. 7, 2015.

Official Communication for U.S. Appl. No. 14/196,814 dated Oct. 7, 2015.

Official Communication for European Patent Application No. 15157642.8 dated Jul. 20, 2015.

* cited by examiner

| TARGET OBSERVATIONS | | |
|---|---|---|
| Device ID = 7 | Tower ID = 5 | Timestamp = 7/1/13 8:54 AM |
| Device ID = 7 | Tower ID = 5 | Timestamp = 7/1/13 8:59 PM |
| Device ID = 7 | Tower ID = 32 | Timestamp = 7/1/13 11:01 PM |
| Device ID = 7 | Tower ID = 7 | Timestamp = 7/1/13 13:35 PM |
| Device ID = 7 | Tower ID = 7 | Timestamp = 7/1/13 6:15 PM |
| Device ID = 7 | Tower ID = 9 | Timestamp = 7/1/13 7:00 PM |
| Device ID = 7 | Tower ID = 5 | Timestamp = 7/1/13 7:30 PM |
| Device ID = 7 | Tower ID = 5 | Timestamp = 7/2/13 1:17 AM |

| MATCHING OBSERVATIONS | |
|---|---|
| Device ID = 1 | Tower ID = 5 | Timestamp = 7/1/13 8:49 AM |
| Device ID = 3 | Tower ID = 5 | Timestamp = 7/1/13 8:49 AM |
| Device ID = 4 | Tower ID = 17 | Timestamp = 7/1/13 8:50 AM |
| Device ID = 1 | Tower ID = 5 | Timestamp = 7/1/13 8:52 AM |
| Device ID = 8 | Tower ID = 9 | Timestamp = 7/1/13 8:52 AM |
| Device ID = 8 | Tower ID = 9 | Timestamp = 7/1/13 8:52 AM |
| Device ID = 4 | Tower ID = 17 | Timestamp = 7/1/13 8:55 AM |
| Device ID = 3 | Tower ID = 5 | Timestamp = 7/1/13 8:57 AM |
| Device ID = 16 | Tower ID = 9 | Timestamp = 7/1/13 8:59 AM |

Fig. 5

SYSTEMS AND METHODS FOR DETECTING ASSOCIATED DEVICES

BACKGROUND

Intelligence and law enforcement agencies use various technologies to detect illegal or suspicious activity. The monitoring of electronic activity can assist these efforts. Mobile digital activity of suspicious individuals can sometimes present challenges if, for example, the monitored individual employs techniques to obscure his or her communications or other activity. One of such technique is to carry and interchangeably use two or more mobile devices. If the agencies cannot identify which additional mobile devices are used by the individual, they are unable to effectively monitor the mobile digital activity on those mobile devices.

BRIEF DESCRIPTION OF THE DRAWINGS

Reference will now be made to the accompanying drawings which illustrate exemplary embodiments of the present disclosure. In the drawings:

FIG. 4 illustrates an exemplary set of target observations, consistent with embodiments of the present disclosure;

FIG. 5 illustrates an exemplary set of matching observations for a given target observation, consistent with embodiments of the present disclosure;

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Embodiments of the present disclosure generally relate to systems and methods of detecting associated devices. Such embodiments include systems and methods that are adapted to detect associated devices based on, for example, information about a mobile device associated with a person. Embodiments of the present disclosure also encompass systems and methods capable of detecting other mobile devices associated with the same person. While several embodiments of the present disclosure are disclosed herein with reference to mobile devices, such as mobile phones, smart phones, and satellite phones, it will be appreciated that embodiments of the present disclosure are not limited to such devices and may be adapted or applied to other types of associated devices capable of electronic activity and use by individuals. Examples of other types of associated devices include tablets, Personal Digital Assistants (PDAs), laptops, wearable computing devices, and navigation systems.

Figure 1:
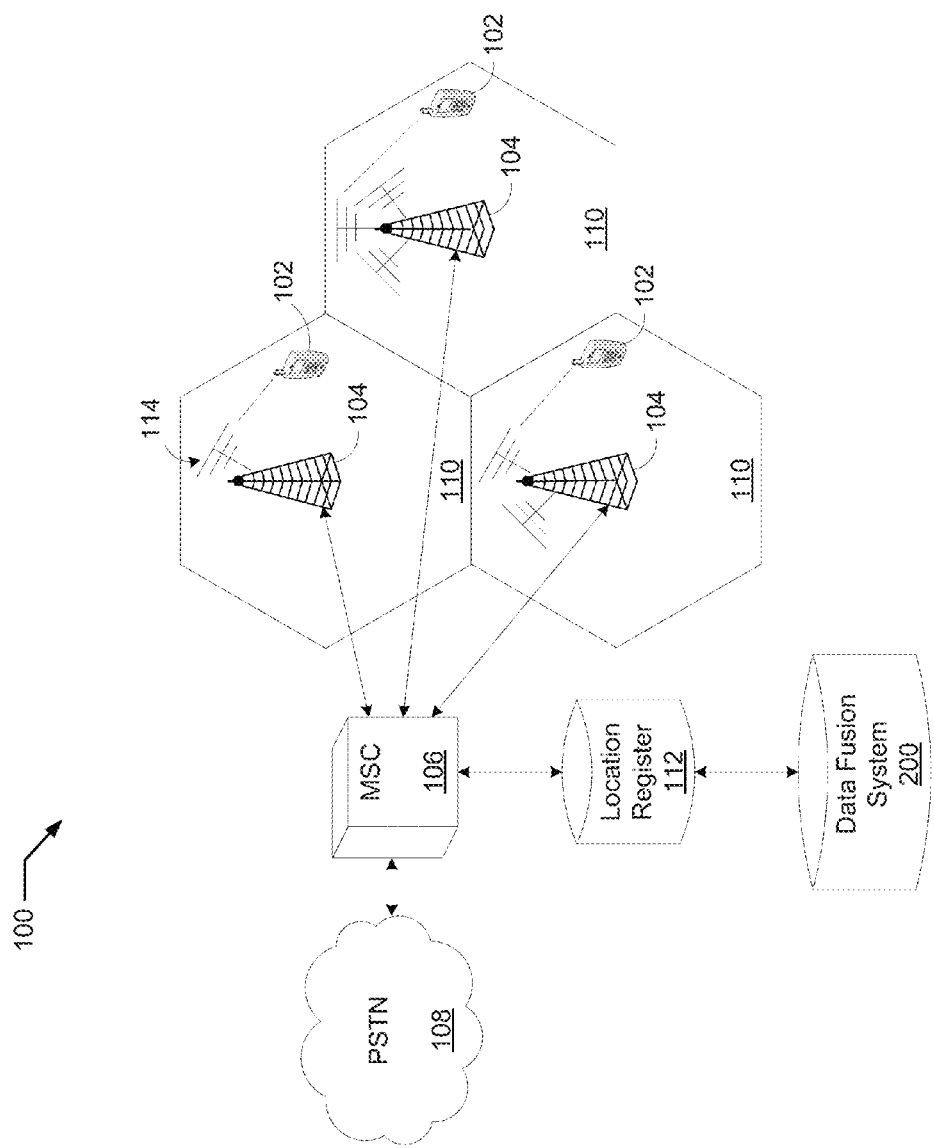
FIG. 1 is a block diagram of an exemplary mobile network, consistent with embodiments of the present disclosure.

Reference is now made to FIG. 1, which illustrates, in block diagram form, an exemplary cellular network 100. As shown in FIG. 1, a land area to be supplied with cellular (radio) service can be divided into shaped cells 110, which can be hexagonal (as shown), square, circular, or have any other suitable shape. Cells 110 can vary in size and can be as small as ¼ mile in diameter and as large as 90 miles in diameter, for example, depending on population density, limitations of the terrain and/or the particular cellular technology being employed, and other factors.

Each cell 110 is associated with (or covered by) a cell tower 104, sometimes referred to as a cell site or a base station. Cell tower 104 can communicate with and manage calls of one or more mobile devices 102 that are located within the boundaries of the cell or are close to the cell. Cell tower 104 can include one or more antennas 114, transmitters, receivers, digital signal processors (DSPs), control electronics, GPS receivers, electrical power sources, and sheltering. Cell tower 104 can be located at the center of its corresponding cell 110 or it can be located at the corner of its corresponding cell 110, for example, when the cell tower utilizes directional antenna, in which case the cell tower can communicate with mobile devices 104 located in more than one cell 110.

The working range of cell tower 104, that is, the range within which mobile devices 102 can connect to it reliably, can be designed such as to cover at least the area of the cell (or cells) it is supposed to cover. Cell tower 104 can cover some additional area outside of its cell, which allows "handing over" of an ongoing call from one cell tower to another. The handover can be performed when the mobile phone is moving away from one cell tower 104 to another cell tower 104; that is, moving from one cell 110 into another cell 110. Cellular network 100 can detect a handover situation, for example, by comparing the signal strength of the mobile device's transmissions at each of the two cell towers, and determining that the signal at one tower is becoming stronger as the signal at the other tower is becoming weaker. The handover can also be required when one cell tower is at or near its capacity for connecting new calls, in which case the call can be transferred to another cell tower, if the mobile device is located in an overlapped area and can reliably communicate with both of the cell towers.

Cell tower 104 can support one or more digital cellular communication standards (e.g., Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN)), and/or analog cellular communication standards (e.g., Advanced Mobile Phone System (AMPS)). Cell tower 104 can also support one or more different service providers (carriers), such as Verizon Wireless, AT&T Mobility, Sprint Corporation, T-Mobile, and the like. Each service provider can install its own antenna 114 or it can share antenna 114 with one or more other service providers. Each service provider can be identified with a unique System Identification Code (SID).

Mobile device 102 can be a cellular phone, a satellite phone, or any other electronic communication device whose geographic location can be ascertained. Mobile device 102 can communicate with cell towers 104 and/or any other equipment containing antennas, such one or more space satellites. Mobile device 102 can include a Global Positioning System (GPS) module, which enables it to ascertain its geographic location and send information about its geographic location to other devices.

Cellular network 100 can include one or more Mobile Switching Centers (MSCs) such as an MSC 106. MSC 106 can be connected to one or more cell towers 104 and includes equipment for controlling the cell towers and for routing calls to and from mobile devices 102 wirelessly connected to those cell towers. It is appreciated that the term "calls" can include voice calls, circuit switched data, SMS, conference calls, FAX, and other types of communication data. It is further appreciated that the terms "connected to," "wirelessly connected to," "communicating with," and similar terms, can be used interchangeably when referring to the exchange of wireless signals between mobile devices 102 and cell towers 104.

MSC 106 can also be connected to a Public Switched Telephone Network (PSTN) 108, through which it can receive calls from, and send calls to other devices, such as mobile devices 102 (including mobile devices 102 connected to cell towers 104 that are connected to other MSCs (not shown)), landline telephone sets (not shown), or any other devices that can be connected to PSTN 108 either directly or via additional networks, such as the Internet (not shown).

MSC 106 can also communicate with a location register 112. In some embodiments, location register 112 can include one or more local location registers, such as Visitor Location Registers (VLRs) that can be stored at MSCs such as MSC 106, and one or more global location registers, such as Home Location Registers (HLRs) that can be stored remotely, where all the databases can be synchronized periodically. Location register 112 can include one or more location registers, and each location register can store information for one or more service providers.

Location register 112 can store information about one or more mobile devices 102. For example, location register 112 can store, for each mobile device 102, its phone number, its device ID, such as the international mobile subscriber identity (IMSI), the name of its subscriber, a list of subscribed services and features, and the like.

Location register 112 can also store observation data for each of the mobile devices. In some embodiments, MSC 106 can obtain observation data for any mobile device 102 connected to any cell tower 104 controlled by and connected to MSC 106. MSC 106 can obtain new observation data any time that the mobile device wirelessly communicates with any of the cell towers. It will be appreciated that observation data for each mobile device 102 can be obtained not only when the mobile device participates in a call, but at any time that the mobile device sends a signal which is received by a cell tower, where the signal identifies the mobile device. Examples of such activity includes text messaging and SMS relays, as well as other forms of data transmission or communications.

In some embodiments, MSC 106 can obtain observation data from other sources, such as one or more communication centers operating a network of satellite phones.

MSC 106 transmits the observation data to location register 112, which then stores the observation data. The observation data can include device information identifying the observed mobile device, location information identifying the location at which the mobile device was observed, and time information identifying the time at which it was observed.

Location information can include a unique "tower ID" of the cell tower to which the mobile device was connected at the time of the observation. Location information can also include the location (e.g., the latitude-longitude coordinates) of the cell tower. In some embodiments, instead of or in addition to the tower ID and/or tower location, location information can include the approximate location (e.g., in latitude-longitude coordinates) of the mobile device itself, as ascertained or obtained by, for example, the mobile device using its GPS module. The approximate location can be obtained, for example, by using any suitable location-determination technique, such as triangulation.

In addition to storing the most recently received observation data, location register 112 can store past observation data for a mobile device. For example, location register 112 can store all observation data that was obtained for that mobile device in the past hour, day, month, year, or any other predefined period of time.

Location register 112 can communicate and exchange data with a data fusion system 200, either directly (through a wired or wireless connection) or through a network (not shown). The network can be the Internet, an intranet, a local area network, a wide area network, a campus area network, a metropolitan area network, an extranet, a private extranet, any set of two or more coupled devices, or a combination of any of these or other appropriate networks.

Figure 2:
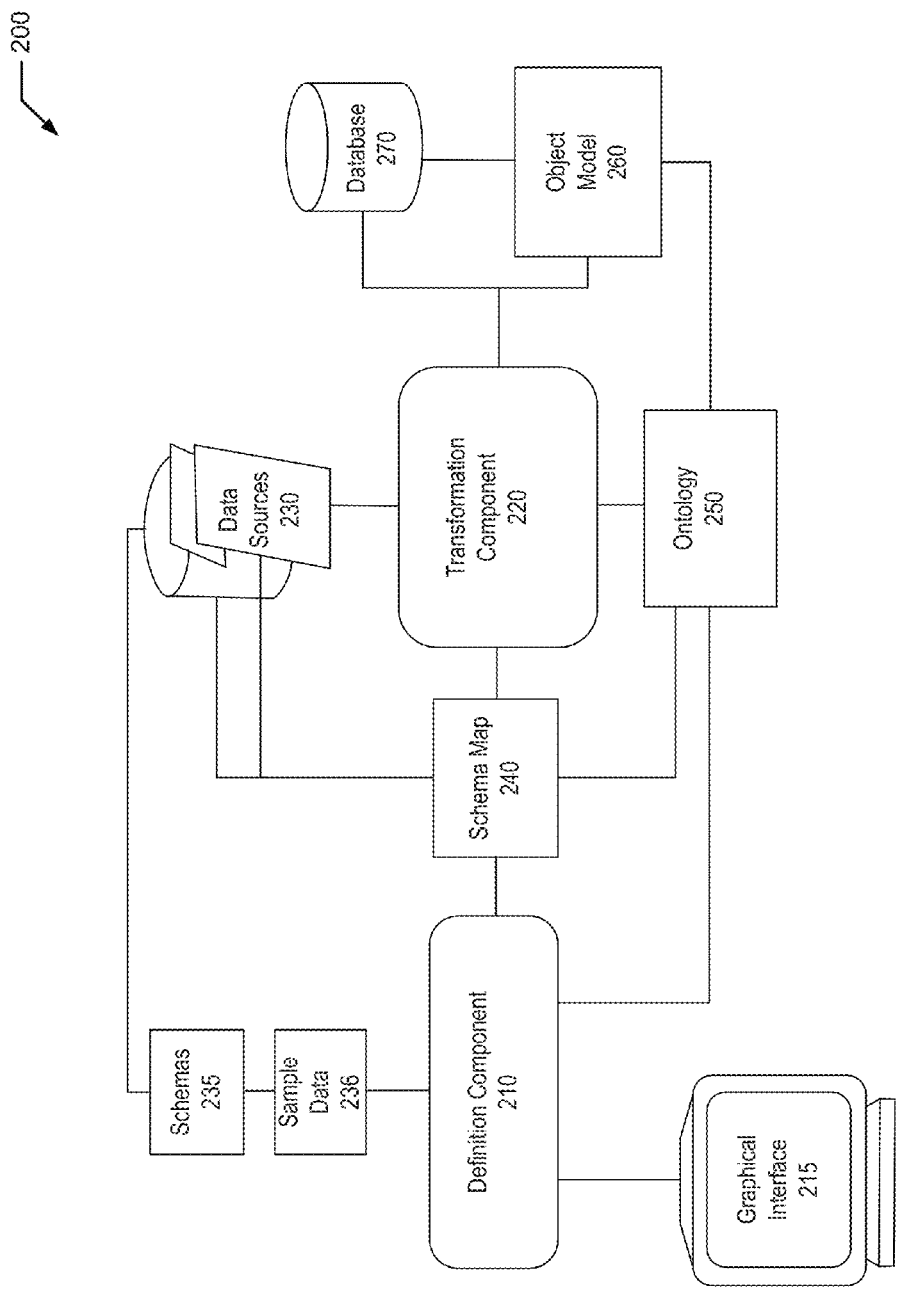
FIG. 2 is a block diagram of an exemplary data fusion system, consistent with embodiments of the present disclosure.

FIG. 2 shows, in block diagram form, an exemplary data fusion system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a translation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 2. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) are described in U.S. Pat. No. 7,962,495 (the '495 patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring back to FIG. 2, schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 features a visual workspace that visually depicts representations of the elements of ontology 250 for which mappings are defined in schema map 240. Graphical interface 215 also includes controls for adding new elements to schema map 240 and/or ontology 250, including objects, properties of objects, and relationships, via the visual workspace. After elements of ontology 250 are represented in the visual workspace, graphical interface 215 can further provide controls in association with the representations that allow for modifying the elements of ontology 250 and identifying how the elements of ontology 250 correspond to elements of schemas 235. Optionally, the graphical interface 215 can further utilize the sample data 236 to provide the user with a preview of object model 260 as the user defines schema map 240. In response to the input via the various controls of graphical interface 215, definition component 210 can generate and/or modify ontology 250 and schema map 240.

In some embodiments, graphical interface 215 can provide an interface providing a user with the ability to add structure to an unstructured document stored in data sources 230 by tagging one or more portions (e.g., text) within the document. Defining tags and applying these tags to a portion of the document can create object, properties, or links creating a relationship between one or more objects and/or properties.

Transformation component 220 can be invoked after schema map 240 and ontology 250 have been defined or redefined. Transformation component 220 identifies schema map 240 and ontology 250. Transformation component 220 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 260 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or instead include temporary data structures generated from underlying data sources via data extraction components, such as a result set returned from a database server executing a database query. Data sources 230 can include or be synchronized with external data sources, such as one or more location registers 112, each storing information for one or more service providers.

Schema map 240, ontology 250, and schemas 235 can be stored in any suitable data structures, such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database.

In some embodiments, system 200 can receive, from location register 112, observation data, which can then be stored in data sources 230 and transformed into object model 260, in accordance with the methods described above. Observation data can comprise a plurality of observation entries, also referred to as "observations," each observation including device information identifying the observed mobile device, location information identifying the location at which the mobile device was observed, and time information identifying the time at which it was observed.

Device information can include any combination of: a phone number associated with the device, a device ID, a name of the user associated with the device, or other types of information identifying the device. Location information can include a tower ID and/or location of the cell tower that was connected to the mobile device at the time of the observation. As discussed above, location information can also include the approximate location (coordinates) of the mobile device at the time of the observation. Time information can include the date and the time of the observation.

Observation data can be unlimited or it can be limited to observations that have occurred within the most recent predefined period of time, for example, within the last day, week, month, etc., in which case older observation entries can be removed from system 200 to save memory space.

Figure 3:
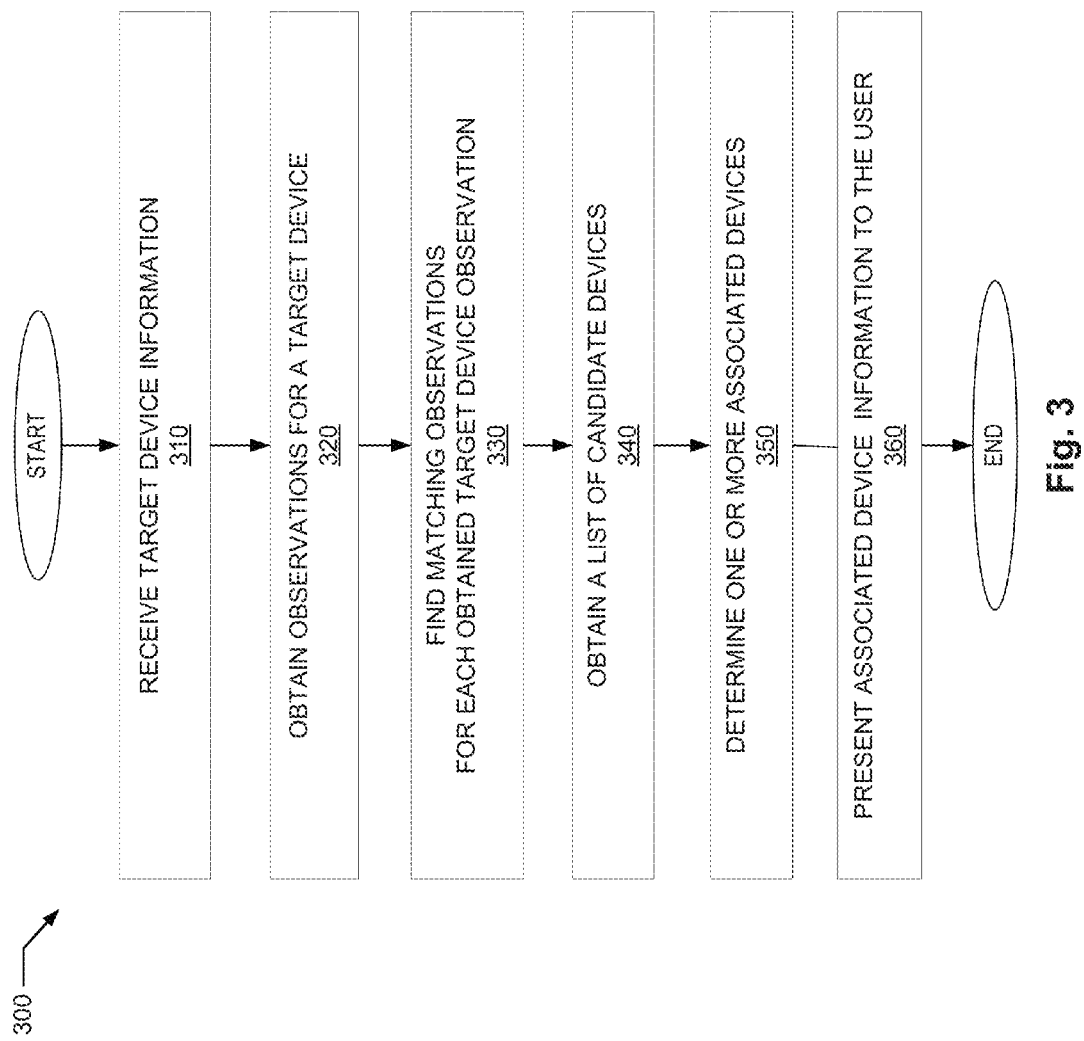
FIG. 3 is a flowchart of an exemplary method for detecting associated devices, consistent with embodiments of the present disclosure.

FIG. 3 is a flowchart representing an exemplary method 300 for detecting associated devices. Method 300 can be performed by one or more electronic devices that can be integrated with or remote to data fusion system 200, but that has access to fusion system 200. While method 300 and the other following embodiments described herein can be performed by multiple electronic devices, for purposes of simplicity and without limitation, these embodiments will be explained with respect to a single electronic device. While the flowchart discloses the following steps in a particular order, it will be appreciated that at least some of the steps can be moved, modified, or deleted where appropriate, consistent with the teachings of the present disclosure.

At step 310, the electronic device receives target device information identifying a target device (e.g., mobile device 102), for which one or more associated devices need to be found. Target device information can be received, for example, from a user through graphic interface 215. Target device information can include the target device's device ID, phone number, and/or any other information uniquely identifying the target device.

At step 320, the electronic device obtains based on the target device information, observations for the target device. For example, the electronic device can access data fusion system 200 and obtain from it one or more observation entries whose device information corresponds to the target device. The electronic device can choose to obtain all observation entries available for the target device, or only a limited set of observation entries, such as observations made within a recent predefined period (e.g., within the last 24 hours, week, month, and the like). FIG. 4 illustrates an exemplary set of observations obtained for the target device, hereinafter referred to as "target observations." As illustrated in FIG. 4, each target observation can include the following information: Device ID, Tower ID, and Timestamp. For example, target observation 410 indicates that a mobile device with a Device ID=7 (the target device) was observed by (connected to) a cell tower with tower ID=5 at 8:54 AM on Jul. 1, 2013. In some embodiments, instead of or in addition to Tower ID, target observations can include the approximate location of the device, for example, in latitude/longitude coordinates.

Referring now back to FIG. 3, in some embodiments, at step 320, the electronic device can preprocess the obtained observations of the target device. Preprocessing can include removing redundant observations—observations that occurred around the same location and around the same time. For example, if there are two or more observations of the target device at the same location (e.g., the same tower ID) and within the same predefined period of time (e.g., 5 minutes), the electronic device can remove all but one of these observations, such that the removed observations are not considered in the following steps. The electronic device can also modify the time information of the one remaining observation to reflect the average time of the two or more observations. Removing redundant observations can improve performance and memory requirements of method 300.

At step 330, the electronic device processes each of the observations of the target device (hereinafter, "target observations") and finds, for each target observation, a set of "matching observations"—observations of other devices that were in the vicinity of the target device at or around the time the target device was observed.

First, the electronic device can determine a set of one or more "nearby towers"—cell towers located within a predefined distance (e.g., within 3,000 meters) of the cell tower to which the target device was connected, including that cell tower itself. To determine the set of nearby towers, the electronic device can access a database (e.g., one of data sources 230 of data fusion system 200 or another internal or external database) containing information of all cell towers in the cellular network, the information including, for example, a tower ID and a latitude/longitude location of each cell tower. Based on that information, the electronic device can obtain tower IDs of all towers that are within a predefined distance from the cell tower of the target observation being processed.

Still referring to step 330, based on the obtained tower IDs of the nearby towers, the electronic device can obtain a set of one or more "matching observations"—all observations made at the nearby towers during a predefined period of time (e.g., +/−5 minutes) around the time of the target observation being processed. FIG. 5 illustrates an exemplary set of matching observations obtained when target observation 410 is being processed. As shown in FIG. 5, nine matching observations are received from three nearby towers (Tower IDs 5, 9, and 17) and included observations of five mobile devices (Device IDs 1, 3, 4, 8, and 16) during the period of +/−5 minutes from the 7/1/13 8:54 AM timestamp of target observation 410. In some embodiments (not illustrated in FIG. 5) target observation 410 can also be obtained among matching observations, in which case it can be removed by the electronic device to simplify processing.

The above-described flexibility in the number of nearby towers being searched can be beneficial because it accounts for the possibility that two devices can be located next to each other (potentially, carried by the same user), and still be connected to different towers. For example, a user may carry two mobile devices subscribed to different carriers (e.g., Verizon Wireless and AT&T Mobility) and operating over different cellular standards (e.g., CDMA and GSM). Due to these differences, each device can be connected to a different cell tower. For example, if the nearest cell tower supports only one of the carriers, only the device subscribed to that carrier can be connected to that tower, while the other device will be connected to another tower—for example, the nearest tower that supports the other carrier. Moreover, even if the two mobile devices are subscribed to the same carrier, they may still be routed to different cell towers—for example, the nearest cell tower can reach its call capacity after connecting to one of the devices, in which case the other device will be routed through (connected to) another cell tower.

In some embodiments, for example, when observation data includes the approximate locations of mobile devices 102 (e.g., latitude and longitude), matching observations can be obtained by finding, based on the approximate locations, all observations that are within a predefined distance (e.g., 1000 feet) from the target observation.

Searching for matching observations some time before and after the time of the target observation can also be beneficial, because mobile devices do not communicate with a cell tower all the time, and so two or more mobile devices located at the same location do not necessarily connect to the cell tower(s) at exactly the same time.

Still referring to step 330, after finding all matching observations for the target observation, the electronic device repeats step 330 for the next target observation, and continues to repeat step 330 until all target observations are processed, that is, until matching observations for all target observations are found.

In some embodiments, the electronic device can preprocess the found matching observations of the target device. The preprocessing can include removing redundant matching observations—matching observations of the same mobile device that occurred around the same location and around the same time. For example, if there are two or more matching observations of the same mobile device at the same location (e.g., at the same tower ID) and within the same predefined period of time (e.g., 5 minutes), the electronic device can remove all but one of these matching observations, such that the removed matching observations are not considered in the following steps. The electronic device can also modify the time information of the one remaining matching observation to reflect the average time of the two or more matching observations. Removing redundant matching observations can further improve performance and memory requirements of method 300.

At step 340 the electronic device obtains, based on the matching observations, a list of unique "candidate devices," that is, mobile devices that appeared in the matching observations at least once. The electronic device can determine the list of candidate devices, for example, by retrieving device information (e.g., device ID) from each of the matching observations obtained at step 330, and adding to the list any device ID that has not yet been added to the list.

At step 350, the electronic device can determine, based on the matching observations, one or more "associated devices"—candidate devices, such as mobile devices 102, that are likely to correspond with the target device (e.g., are likely to be used by the same person who uses the target device).

Figure 6:
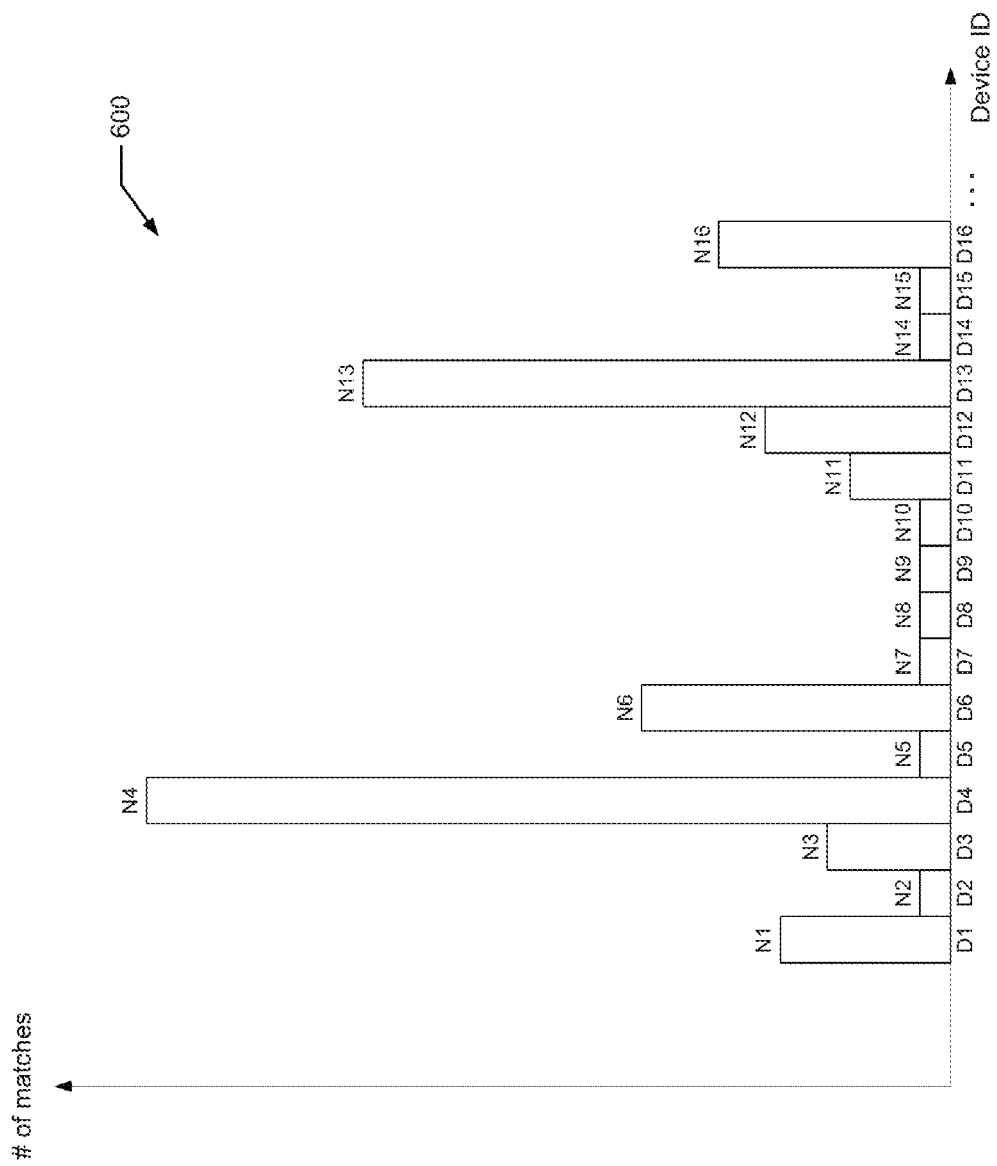
FIG. 6 illustrates an exemplary histogram of matches with candidate devices, consistent with embodiments of the present disclosure.

In some embodiments, the electronic device can calculate the total number of times each candidate device matched the target device, that is, the total number of times each candidate device appeared in the matching observations. The electronic device can build a histogram or a similar type of data structure that reflects the number of times different candidate devices appeared in the matching observations. A fragment of an exemplary histogram 600 is illustrated in FIG. 6. In histogram 600, sixteen candidate devices are represented by Device IDs D1-D16. For each candidate device, histogram 600 represents the number of times (N1-N16, respectively) that the candidate device matched the target device.

In some embodiments, the electronic device can improve performance and reduce memory requirements by eliminating from the histogram and from further consideration any candidate devices who matched the target device less than a predefined number of times (e.g., less than 10 times).

In some embodiments, after calculating the total number of matches for each candidate device, the electronic device can select from the candidate devices a predefined number of candidate devices with the most matches, and designate those selected devices as associated devices. The predefined number can be configurable by the user, for example, through graphical interface 215. For example, referring to the example in FIG. 6, if the predefined number is 2, the electronic device selects two devices, D4 and D13, as associated devices, because these are the two candidate devices with the highest number of matches.

In some embodiments, instead of selecting a predefined number of candidate devices with the most matches, the electronic device can select one or more candidate devices that have more than a predefined number of matches, and designate those selected devices as associated devices. For example, the electronic device can select all candidate devices that have more than a 1,000 matches with the target device. In some embodiments, the electronic device can first select a predefined number of candidate devices with the most matches, and then eliminate from the selected devices any devices that had less than a predefined number of matches. The electronic device can then designate the remaining selected devices as associated devices.

Still referring to step 350, in some embodiments, instead or in addition to counting the number of matches each candidate device had with the target device, the electronic device can select associated devices based on one or more other criteria, discussed in detail below.

In some embodiments, the electronic device can determine one or more associated devices based on the number of unique locations at which each candidate device was matched with the target device. When a candidate device matched with the target device at numerous unique locations, this may be a good indication that the two devices are associated (i.e., frequently carried and used by the same person). In contrast, when most of the matches occur at the same location or at a small number of locations, this may be an indication that the two devices are used by two different people, who just happen to visit or live at the same location. For example, these could be family members, neighbors, co-workers, classmates, etc. Accordingly, the likelihood of a candidate device to be designated as an associated device can be increased as the number of unique locations increases, and vice versa.

The number of unique locations can be calculated by the electronic device, for example, by counting the number of unique tower IDs within the matching observations of each candidate device. Alternatively, because the tower ID of the matching observation can differ from the tower ID of the corresponding target observation (as illustrated in the example of FIG. 4 and FIG. 5), the electronic device can determine for each matching observation its corresponding target observation, and then count unique tower IDs of the target observations, instead.

In some embodiments, the electronic device can determine one or more associated devices based on the time distribution of the matching observations of a candidate device. When a candidate device matched with the target device at various times during the day (e.g., at 5 AM, 11 AM, and at 6 PM), this may be a good indication that the same person uses both devices, since they were observed together when the person was likely to be at home and when the person was likely to at work. In contrast, when most of the matches occur only during one time of the day, for example, only at night time, or only during the day, this may indicate that the devices belong to different people, for example, neighbors or co-workers, respectively, and so the candidate device should not be designated as an associated device. Accordingly, the likelihood of a candidate device to be designated as an associated device can be increased as the time variability (e.g., the statistical variance among the timestamps) of the matching observations increases, and vice versa.

Similarly, in some embodiments, the electronic device can determine one or more associated devices based on the weekday/weekend distribution of the matching observations of a candidate device. When a candidate device matched with the target device on weekends as well as on weekdays, this may be a good indication that the same person uses both devices, whereas when most of the matches occur on weekdays or weekends only, this may indicate that the devices belong to different people. Accordingly, the likelihood of a candidate device to be designated as an associated device can be increased as the weekend/weekday variability of the matching observations increases, and vice versa.

In some embodiments, the electronic device can determine one or more associated devices based on the average distance between the cell towers of consecutive matching observations. When the electronic device determines that the average (or median) distance between time-consecutive observations of a candidate device is large (e.g., larger than a predefined threshold), this may indicate that the candidate device is moving fast (and so does the target device), which can be an indication that both devices are located in a moving car (hereinafter referred to as being on a trip).

In some embodiments, the electronic device can further determine the lengths of such trips and consider only trips longer than a predefined distance or time, thereby excluding a potential scenario in which the two devices are located in nearby cars that just happen to be driving in the same direction. Because cars are unlikely to drive close to each other for very long distances, if the electronic device determines that the trip was very long (e.g., longer than a predefined distance or time) the two devices are likely to be travelling in the same car. Accordingly, the likelihood of a candidate device to be designated as an associated device can be increased when the electronic device determines that the candidate device matched the target device during a long trip. The trips can be detected by measuring the average (or median) distance between cell towers in consecutive observations, or by measuring the travelling speed of the candidate device—for example, by dividing distance between consecutive observations by the time period between the observations. The likelihood can be increased with the number as well as the lengths of the trips.

The electronic device can determine associated devices based on any combination of the above-described factors. For example, the electronic device can assign a score to each candidate device, the score being comprised of any combination, such as a weighted combination, of the above-described factors such as a) the total number of matches; b) the number of unique towers; c) the variability of the time distribution; d) the variability of the weekend/weekday distribution; e) the number and the lengths of the trips; and any other factors.

At step 360, the electronic device can present information about the determined associated devices to the user, for example, by sending this information to graphical interface 215. The presented information for each associated device can include its device ID, phone number, subscriber's name, and the confidence (likelihood) level that the device is used by the same person who uses the target device (as determined, for example, based on a score that is assigned based on the combination of one or more factors described herein). In addition, the presented information can include all matching observations obtained for that device. The matching observations can be presented to the user in association with the corresponding target observations, either in a list, or on a map, or using any other textual and/or graphical representation. The user can further analyze the presented information, determine which, if any, of the associated devices are indeed likely to be used by the user of the target device, and then request (e.g., through graphical interface 215) any additional information about those associated devices.

In some embodiments, in addition to or in conjunction with the above-described geolocation-based techniques of determining associated devices, the electronic device can use the following non-geolocation-based methods to determine associated devices.

In some embodiments, the electronic device can access a database (e.g., one of data sources 230 of data fusion system 200 or another internal or external database) that stores subscriber names and devices associated with those subscribers. The electronic device can then find a subscriber based on the target device information received from the user, and then present to the user device information for any other devices associated with the subscriber name.

In some embodiments, the electronic device can access a database (e.g., one of data sources 230 of data fusion system 200 or another internal or external database) that stores information on mobile devices and the contacts associated with those devices. Contacts can include names and/or phone numbers of people to whom the mobile device has made one or more calls and/or who appear in the mobile device's address book. The electronic device can determine the contacts of the target device, and find, in the database, other mobile devices that have many (e.g., more than a predefined number) of the same contacts.

In some embodiments, the electronic device can access a database (e.g., one of data sources 230 of data fusion system 200 or another internal or external database) that stores information on subscriber identity module (SIM) cards and the device IDs associated with the SIM cards. For example, every time a mobile device places a call, its SIM card information and its device ID are both transmitted to the MSC, which can then transmit that information in the location register, from which the information can be transmitted to data fusion system 200. If a user removes the SIM card from one device and puts it into a different device, both devices will become associated with the same SIM card in the database. Based on this association, the electronic device can find device ID of one of the devices if given device ID of the other device.

According to some embodiments, the operations, techniques, and/or components described herein can be implemented by the electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
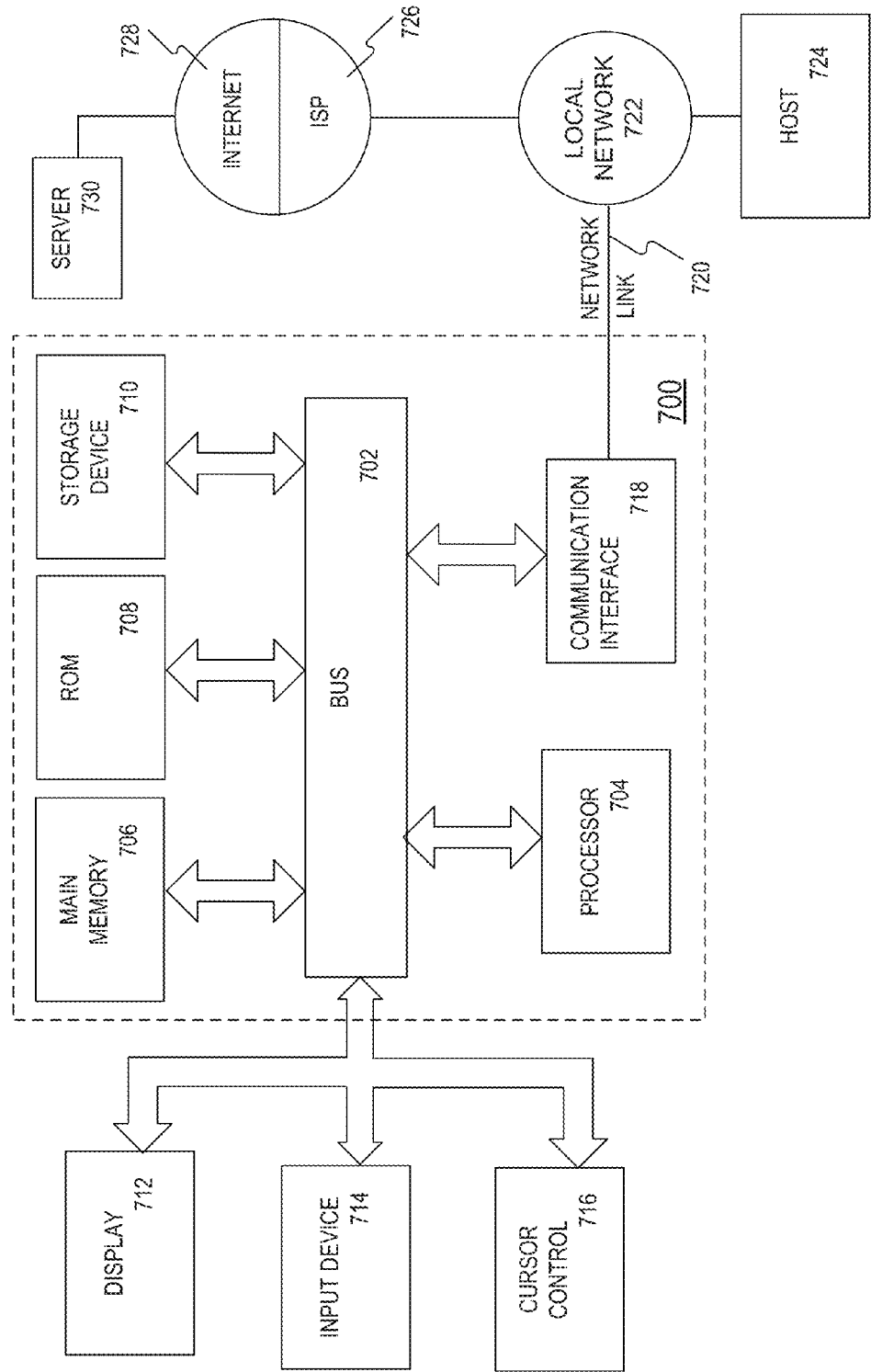
FIG. 7 is block diagram of an exemplary electronic device with which embodiments of the present disclosure can be implemented.

By way of example, FIG. 7 is a block diagram that illustrates an implementation of electronic device 700, which, as described above, can comprise one or more electronic devices. Electronic device 700 include a bus 702 or other communication mechanism for communicating information, and one or more hardware processors 704, coupled with bus 702 for processing information. One or more hardware processors 704 can be, for example, one or more general purpose microprocessors.

Electronic device 700 also includes a main memory 706, such as a random access memory (RAM) or other dynamic storage device, coupled to bus 702 for storing information and instructions to be executed by processor 704. Main memory 706 also can be used for storing temporary variables or other intermediate information during execution of instructions to be executed by processor 704. Such instructions, when stored in non-transitory storage media accessible to one or more processors 704, render electronic device 700 into a special-purpose machine that is customized to perform the operations specified in the instructions.

Electronic device 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Electronic device 700 can be coupled via bus 702 to a display 712, such as a cathode ray tube (CRT), an LCD display, or a touchscreen, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 700 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 700 can implement the techniques and other features described herein using customized hard-wired logic, one or more ASICs or FPGAs, firmware and/or program logic which in combination with the electronic device causes or programs electronic device 700 to be a special-purpose machine. According to some embodiments, the techniques and other features described herein are performed by electronic device 700 in response to one or more processors 704 executing one or more sequences of one or more instructions contained in main memory 706. Such instructions can be read into main memory 706 from another storage medium, such as storage device 710. Execution of the sequences of instructions contained in main memory 706 causes processor 704 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media can be involved in carrying one or more sequences of one or more instructions to processor 704 for execution. For example, the instructions can initially be carried on a magnetic disk or solid state drive of a remote computer. The remote computer can load the instructions into its dynamic memory and send the instructions over a telephone line using a modem. A modem local to electronic device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 can optionally be stored on storage device 710 either before or after execution by processor 704.

Electronic device 700 also includes a communication interface 718 coupled to bus 702. Communication interface 718 provides a two-way data communication coupling to a network link 720 that is connected to a local network 722. For example, communication interface 718 can be an integrated services digital network (ISDN) card, cable modem, satellite modem, or a modem to provide a data communication connection to a corresponding type of telephone line. As another example, communication interface 718 can be a local area network (LAN) card to provide a data communication connection to a compatible LAN. Wireless links can also be implemented. In any such implementation, communication interface 718 sends and receives electrical, electromagnetic or optical signals that carry digital data streams representing various types of information.

Network link 720 typically provides data communication through one or more networks to other data devices. For example, network link 720 can provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from electronic device 700, are example forms of transmission media.

Electronic device 700 can send messages and receive data, including program code, through the network(s), network link 720 and communication interface 718. In the Internet example, a server 730 might transmit a requested code for an application program through Internet 728, ISP 726, local network 722 and communication interface 718.

The received code can be executed by processor 704 as it is received, and/or stored in storage device 710, or other non-volatile storage for later execution.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the exemplary methods or processes disclosed herein.

What is claimed is:

1. An electronic device comprising:
   one or more computer-readable storage media that store instructions; and
   one or more processors that execute the instructions to:
   obtain information about a target device;
   determine, based on the information about the target device, one or more target observations that include a target time and a target location;
   identify one or more candidate observations of one or more candidate devices, wherein the candidate observations include a second time and a second location that correspond with the target time and the target location; and
   designate the one or more candidate devices as being associated devices that correspond with the target device if a number of candidate observations of the one or more candidate devices is more than or equal to a predefined number.

2. The electronic device of claim 1, wherein the one or more processors further execute the instructions to designate the one or more devices as being associated devices based on a number of candidate observations of the one or more candidate devices.

3. The electronic device of claim 1, wherein the one or more processors further execute the instructions to designate the one or more devices as being associated devices if a number of unique second locations within the one or more candidate observations of the one or more candidate devices is more than or al to a redefined number.

4. A method performed by at least one electronic device comprising one or more processors, the method comprising:
   obtaining information about a target device;
   determining, based on the information about the target device, one or more target observations that include a target time and a target location;
   identifying one or more candidate observations of one or more candidate devices, wherein the candidate observations include a second time and a second location that correspond with the target time and the target location; and
   designating the one or more candidate devices as being associated devices that correspond with the target device if an amount of candidate observations of the one or more candidate devices is more than a predefined number.

5. The method of claim 4, further comprising sending information related to any designated associated devices to a display.

6. The method of claim 4, wherein the second time is within a predefined time period from the target time, and wherein the second location is within a predefined distance from the target location.

7. The method of claim 4, wherein the second location identifies a second cell tower and the target location identifies a target cell tower, and wherein the second cell tower is located within a predefined distance from the target cell tower.

8. The method of claim 4, wherein the designating the one or more candidate devices as being associated devices comprises designating the one or more candidate devices as being associated devices based on a number of candidate observations of the one or more candidate devices.

9. The method of claim 8, wherein the designating the one or more candidate devices as being associated devices comprises determining a predefined number of the one or more candidate devices having the most candidate observations.

10. The method of claim 4, wherein the designating the one or more candidate devices as being associated devices comprises determining that any of the one or more candidate devices has a number of candidate observations that is more than or equal to a predefined number of candidate observations.

11. The method of claim 4, wherein the designating the one or more candidate devices as being associated devices comprises designating the one or more candidate devices as being associated devices if a number of unique second locations within the one or more candidate observations of the one or more candidate devices is more than or equal to a predefined number.

12. The method of claim 4, wherein the designating the one or more candidate devices as being associated devices comprises designating the one or more candidate devices as being associated devices based on a variability of the second times of the one or more candidate observations of the one or more candidate devices.

13. The method of claim 4, wherein the designating the one or more candidate devices as being associated devices comprises designating the one or more candidate devices as being associated devices based on an average distance between the second locations of the one or more candidate observations of the one or more candidate devices.

14. A non-transitory computer-readable medium storing a set of instructions that are executable by one or more electronic devices, each having one or more processors, to cause the one or more electronic devices to perform a method, the method comprising:
    obtaining information about a target device;
    determining, based on the information about the target device, one or more target observations that include a target time and a target location;
    identifying one or more candidate observations of one or more candidate devices, wherein the candidate observations include a second time and a second location that correspond with the target time and the target location; and
    designate the one or more candidate devices as being associated devices that correspond with the target device if an amount of candidate observations of the one or more candidate devices is more than a predefined number.

15. The non-transitory computer-readable medium of claim 14, further comprising instructions executable by the one or more electronic devices to cause the one or more electronic devices to perform the following operation:
    sending information related to the any associated devices to a display.

16. The non-transitory computer-readable medium of claim 14, wherein the second time is within a predefined time period from the target time, and wherein the second location is within a predefined distance from the target location.

17. The non-transitory computer-readable medium of claim 14, wherein the second location identifies a second cell tower and the target location identifies a target cell tower, and wherein the second cell tower is located within a predefined distance from the target cell tower.

18. The non-transitory computer-readable medium of claim 14, further comprising instructions executable by the one or more electronic devices to cause the one or more electronic devices to perform the following operation:
    designating the one or more candidate devices as being associated devices based on a predefined number of the one or more candidate devices having the most candidate observations.

19. The non-transitory computer-readable medium of claim 14, further comprising instructions executable by the one or more electronic devices to cause the one or more electronic devices to perform the following operation:
    designating the one or more candidate devices as being associated devices if a number of unique second locations within the one or more candidate observations of the one or more candidate devices is more than or equal to a predefined number.

20. The non-transitory computer-readable medium of claim 14, further comprising instructions executable by the one or more electronic devices to cause the one or more electronic devices to perform the following operation:
    designating the one or more candidate devices as being associated devices based on a variability of the second times of the one or more candidate observations of the one or more candidate devices.

* * * * *